United States Patent [19]
Pitegoff et al.
[11] 3,723,649
[45] Mar. 27, 1973

[54] ADAPTIVE BINARY STATE DECISION SYSTEM

[75] Inventors: Alexander D. Pitegoff, Brookline; Robert E. Wernikoff, Cambridge; James E. Cunningham, Brookline, all of Mass.

[73] Assignee: Electronic Image Systems Corporation, Cleveland, Ohio

[22] Filed: Apr. 27, 1971

[21] Appl. No.: 137,763

[52] U.S. Cl. .......... 178/7.1, 328/164
[51] Int. Cl. .......... H04n 1/40
[58] Field of Search ......178/7.1, 7.2, DIG. 3; 328/14, 328/150, 164; 179/15 AD; 307/268

[56] References Cited

UNITED STATES PATENTS 3,223,778 12/1965 Stone et al. .......... 178/7.1
3,415,950 12/1968 Bartz et al. .......... 178/7.1
3,472,958 10/1969 Estock .......... 178/7.1

*Primary Examiner*—Robert L. Griffin
*Assistant Examiner*—George G. Stellar
*Attorney*—Russell L. Root and Ray S. Pyle

[57] ABSTRACT

Means for quantizing the continuously varying analog signal output of a facsimile photodetector into a two level binary signal respectively characteristic of detailed black and white areas of a sheet being scanned. The quantizing means provides for later compression of the binary signal by limiting the level shifts in the binary signal to occur only when the analog signal clearly represents a change to the opposite characteristic as determined when the analog signal crosses two separated threshold levels that continuously or discretely adjust in response to the levels of the analog signal representing black and white.

18 Claims, 11 Drawing Figures

INVENTORS
ALEXANDER D. PITEGOFF
ROBERT E. WERNIKOFF
JAMES E. CUNNINGHAM
BY
Weingarten, Maxham & Schurgin
ATTORNEYS INVENTORS
ALEXANDER D. PITEGOFF
ROBERT E. WERNIKOFF
JAMES E. CUNNINGHAM
BY Weingarten, Maxham & Schurgin
ATTORNEYS INVENTORS
ALEXANDER D. PITEGOFF
ROBERT E. WERNIKOFF
JAMES E. CUNNINGHAM
BY
ATTORNEYS INVENTORS
ALEXANDER D. PITEGOFF
ROBERT E. WERNIKOFF
JAMES E. CUNNINGHAM
BY
Weingarten, Maxham & Schurgin
ATTORNEYS INVENTORS
ALEXANDER D. PITEGOFF
ROBERT E. WERNIKOFF
JAMES E. CUNNINGHAM
BY
Weingarten, Maxham & Schurgin
ATTORNEYS INVENTORS
ALEXANDER D. PITEGOFF
ROBERT E. WERNIKOFF
JAMES E. CUNNINGHAM
BY
Weingarten, Maxham & Schurgin
ATTORNEYS

ADAPTIVE BINARY STATE DECISION SYSTEM

FIELD OF THE INVENTION

This invention relates to binary decision logic circuitry and more particularly to circuitry for quantizing an analog signal, such as produced by a facsimile photodetector, into a two level, binary signal.

BACKGROUND OF THE INVENTION

In optical scanning and facsimile systems, a sheet containing printed information or other indicia is scanned, and light reflected from the sheet is photodetected with the resulting analog electrical signal processed to determine whether elemental areas along a scanned path are black or white in order to distinguish between the sheet itself and indicia contained thereon. Binary decision logic is usually employed utilizing a threshold level between black and white to convert the analog photodetector output signal of the optical scanner to a two level binary signal wherein each level corresponds to respective black and white detected reflections from background and printed portions of a scanned sheet. It is known that such detected reflections from a scanned sheet vary widely not only from sheet to sheet but also from portion to portion on a single sheet. Also, because of variations in light transmission in a single scan line a corresponding variation in detected light from the same sheet characteristic is encountered across the scan line and often appears as a bowing effect in the resulting electrical signal for that scan line. The variations in the detected reflections cause corresponding variations in the absolute magnitude of the portions of the photodetector signal representing black and white, as well as variations in the relative separation between the black and white portions of the signal. These effects make it impossible to establish a single, constant threshold level for accurate black-white detection. Significant levels of noise are also combined with the photodetector signal and tend to partially mask the true black-white information in the photodetector signal.

Several systems are known for adjusting the threshold or decision level for providing a binary output signal representing black and white data, representative examples of these systems being shown in U.S. Pat. Nos. 2,975,371, 3,322,893 and 3,339,178 where a single black-white decision threshold is established as a weighted average of the photodetector output signal, as provided by the sum of the outputs from a multi-tapped delay line or similar signal averaging and storing means. A major deficiency of these single threshold level systems results from an assumption that all photodetector signals to one side of the threshold represent black and to the other side of the threshold represent white. In reality, and particularly with practical photodetector signal-to-noise ratios, a substantial number of threshold crossings represent only noise which is erroneously encoded as a black-white transition. An example of multiple threshold level detection systems is the digital encoder shown in U.S. Pat. No. 3,294,896 wherein two threshold levels representing black and white are established and a multilevel gray scale is provided between the black and white thresholds. This system, however, does not overcome the problems of adjusting digital decision logic to varying black-white photodetector signal levels and varying photodetector signal-to-noise ratios.

In addition to the problems of conventional optical scanning systems in detecting black and white threshold levels, a further problem commonly arises by reason of the finite, non-zero size spot illuminated for detection by an optical scanner. As is known, optical scanning systems generally operate by detecting light or other radiation reflected from a spot of finite size on a sheet or object being scanned. The finite size of the spot places a resolution limit on the response of a scanning system to detailed information contained on a sheet in the form of closely spaced alternately black and white areas. The size of the finite spot cannot be reduced beyond certain practical limits by reason of optical, wavelength, and luminosity considerations. As a result, black-white detail is lost which, heretofore, has been by only be reducing the scan rate or by the provision of expensive and complex signal correlation techniques.

BRIEF SUMMARY OF THE INVENTION

In an exemplary preferred embodiment of the invention, electronic binary decision logic is provided for quantizing the analog output signal of an optical scanning photodetector into a two level binary signal respectively representative of detailed relatively black and relatively white areas of a sheet being scanned, and with the binary level decision determined by the magnitude of the photodetector signal relative to continuously adjustable black and white threshold levels. The respective black and white threshold levels are adjusted in response to variations in weighted maxima and minima of the photodetector signal. More accurate, noise free correspondence is thereby achieved between each binary signal level and the respective black and white characteristics of a scanned sheet. Hysteresis is operative in the decision logic to provide a change in binary signal level only after the photodetector signal traverses the threshold level opposite from the level establishing the existing binary signal. The hysteresis decision characteristic minimizes the number of changes between levels of the digital signal, and provides a binary signal more capable of information compression prior to its transmission.

Alternatively, adjustment of the respective black and white thresholds is made once in response to photodetector signals generated during a prescan. The prescan can be made for each line, in advance of a scan that determines digital levels, or once for each document by prescanning a selected portion of the document.

According to the invention, resolution limitations due to the finite size of the scanning spot are compensated by a photodetector filter which restores fine detail information that would otherwise be masked by photodetector noise, this filter at the same time avoiding extremely high levels of overall photodetector noise by reducing higher frequency components.

Though of great importance to the optical scanning and facsimile arts, the binary state decision system according to the invention finds significant application in other fields where it is desirable to perform a two level quantization of an analog signal, such as in mark sensing, particle detection and signal level restoration.

DESCRIPTION OF THE DRAWINGS

An adaptive binary state decision system according to the invention will be more fully understood by reference to the following detailed description of preferred embodiments presented for purposes of illustration and not limitation and read in conjunction with the accompanying drawings, in which:

FIGS. 6A–6F are waveform diagrams of representative photodetector output signals as filtered for use according to the invention;

FIGS. 7A and 7B are further waveform diagrams showing photodetector outputs, threshold and tracking levels, and black-white two level binary output signals according to the invention;

DETAILED DESCRIPTION OF THE PREFERRED EMBODIMENT

Figure 1:
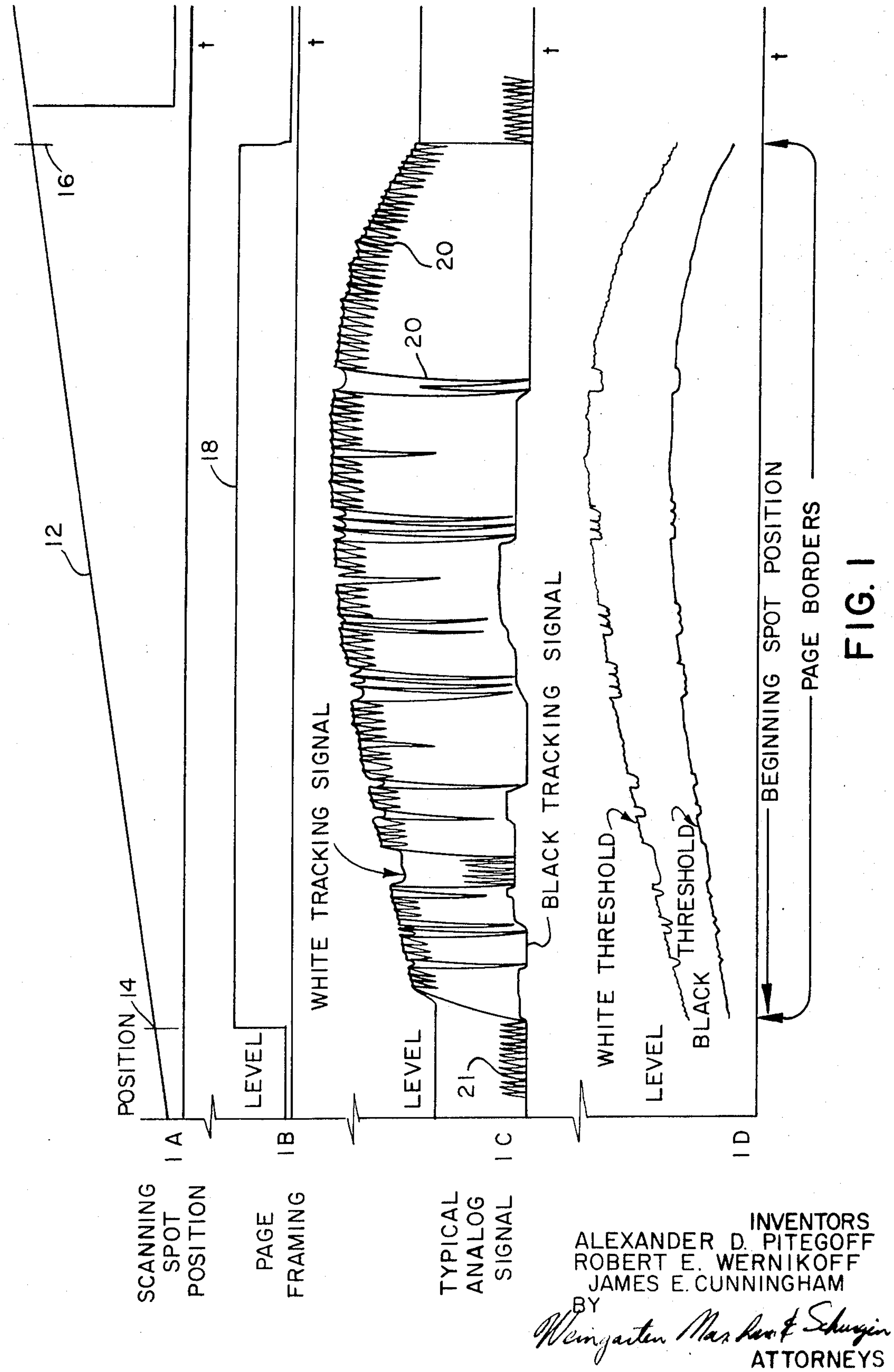
FIGS. 1A–1D are waveform diagrams representing control signals for an optical scan according to the invention and photodetector output signals with associated tracking and threshold levels according to the invention.

Referring to FIGS. 1A-1D time varying positional and electrical waveforms are shown representative of the operation of a typical optical scanning system. In FIG. 1A a ramp 12 is shown representative of the position of a scanning spot of light from a scanning head typically employed in known facsimile or optical scanning systems. The level of the ramp 12 represents the position of the spot of illumination as it scans in a single scan line across a sheet of information. Edge marks 14 and 16 near either extreme of the ramp 12 represent the edge of the sheet after appropriate calibration of the scanning system.

In FIG. 1B a binary signal 18 is shown and is in a positive state only between the markers 14 and 16 over the intermediate part of the ramp 12 to mark the time when the scanning spot is on the scanned sheet between its edges.

In FIG. 1C there is shown a time varying waveform 20 which is a typical output from a photodetector of an optical scanning system responding to reflections from a scanning spot as it passes along a sheet. In the representation of FIG. 1C the higher photodetector output levels represent relatively high reflectivity sheet background or white characteristics, while the lower output levels represent contrasting relatively lower reflectivity printing or black characters on the sheet. As can be seen from the waveform 20 of FIG. 1C there is an absence of a clear, straight line between what is assuredly printing and what is assuredly background characteristics on the sheet. Variation in light transmission efficiency across the scan line effectively creates a bowing effect to the peaks of the photodetector output 20 representing the background or normally white characteristic of the sheet. At the same time the valleys are not consistently to the same level and in fact several valleys may reflect a condition other than the presence of an information containing mark on the sheet. In addition, substantial amounts of noise 21, indicated as continuously present ripples in the waveform 20, are combined with the photodetector signal and may reach peak-to-peak amplitudes substantially greater than shown in FIG. 1C.

Further problems are due to spot size limitation for the scanning spot which, for practical sensing by a photodetector, must have a finite, non-zero, dimension. This finite size causes a resolution loss in that fine details of the sheet scanned will not produce as large an amplitude change in the photodetector output as broader markings of the sheet and consequently may not be detected as markings.

Figure 2:
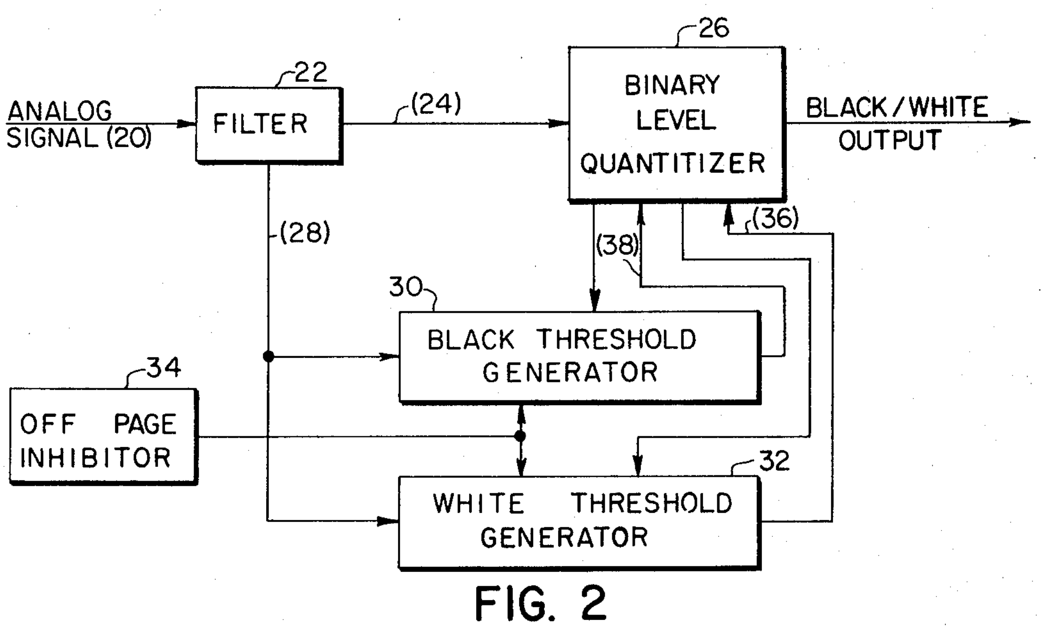
FIG. 2 is a block diagram of an adaptive binary state decision system according to the invention.

Referring now to FIG. 2 the analog signal from the photodetector is applied to a two level quantizing circuit indicated in basic block diagram form. The analog signal 20 is applied to a filter system 22 from which a preemphasized signal 24 is fed to a binary level quantizer 26 which outputs a digital signal in one of two discrete levels indicating a corresponding black or white characteristic to the sheet scanned. A band limited signal output 28 from the filter 22 is fed to a black threshold generator 30 and a white threshold generator 32. These threshold generators track both the peak levels and the valley or minimum levels of the analog signal 20 and from them produce respective black and white thresholds for use by the quantizer 26 in deciding whether to output a digital level indicating black or white. The quantizer 26 provides a shift to the digital output level representing black only when the analog signal 20 passes below the black threshold and a shift to the digital output level representing white only when the analog signal 20 passes above the white threshold. Hysteresis is present due to a significant separation between the threshold levels. An off-page inhibitor circuit 34 responds to the plus level of the waveform of FIG. 1B to enable the black and white threshold generators 30 and 32 to respond to peak and valley level variations only when the scanning spot is indicated to be on the sheet between its edges. At all other times the thresholds are held constant.

Figures 3A, 3B, 3C:
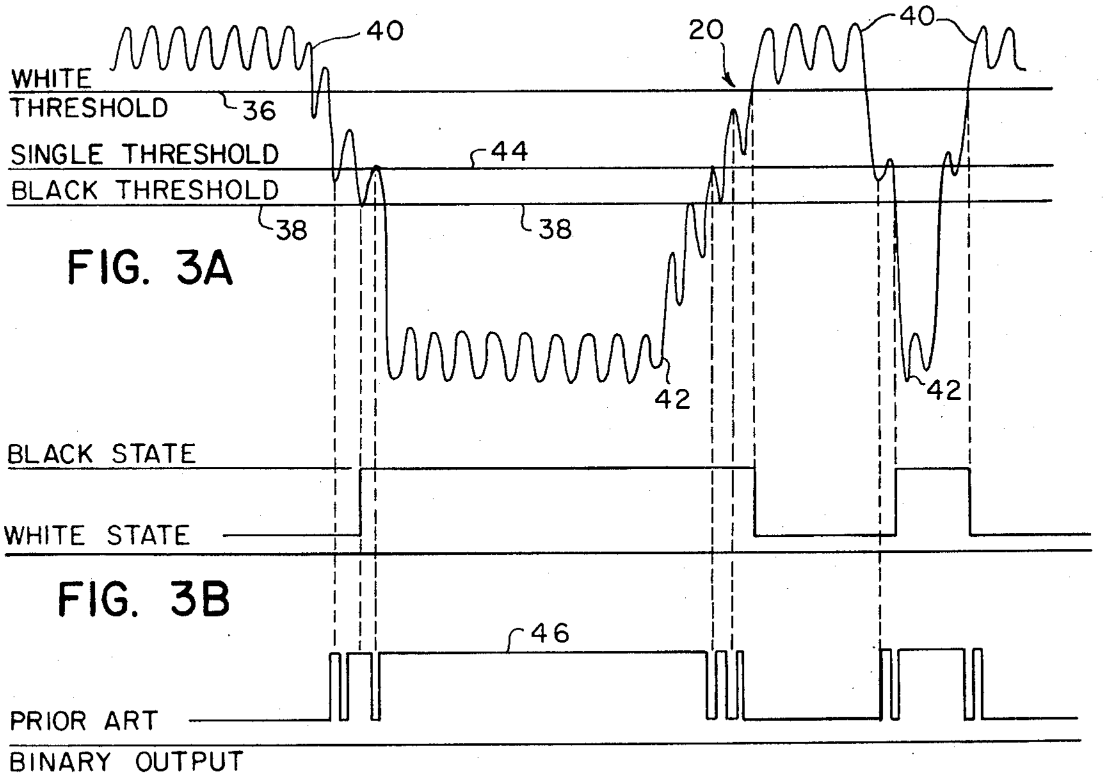
FIGS. 3A-3C are waveform diagrams of a portion of FIG. 1D on an expanded scale and further show corresponding two level, binary output signals according to the invention and according to the prior art.

The operation of the quantizer 26 will be more fully understood by referring to FIG. 3A where the analog signal 20 from the facsimile photodetector is shown over a small section of the time scale of a full scan indicated in FIG. 1C. Relatively higher level white threshold 36 and relatively lower level black threshold 38 are shown at levels intermediate the analog signal relative maximum and minimum signal swings 40 and 42 respectively. The output of the quantizer 26 is indicated by the waveform of FIG. 3B with a relatively higher level representing black and corresponding to the existence of a minimum 42 while a relatively lower level in FIG. 3B represents white and corresponds to the maximum 40. The black or white state at the output of the quantizer 26 indicates that analog input signal 20 is respectively below the black threshold or above the white threshold or is intermediate the two thresholds having been respectively most recently below the black threshold 38 or above the white threshold 36. Once the output of the quantizer 26 has changed from one state to the other it can change back only after the analog input signal has traversed both threshold levels. The separation between the white and black thresholds 36 and 38 provides a hysteresis effect that prevents the output of the quantizer 26 from reflecting rapidly changing noise levels as would be the case where a single threshold level, exemplified by the prior art level 44, is the sole basis for the binary state decision and produces the digital output 46 in FIG. 3C.

The advantages of the digital output represented in FIG. 3B over that shown in FIG. 3C can be best explained by reference to information theory principles. As is well known, the real-time quantized analog output of a facsimile photodetector is not random, that is, very little information is contained in the digital signal representing a single scan line compared to the amount of time used in producing that scan line in view of the bandwidth of the channel over which it is to be transmitted. This condition is a reflection of the fact that most sheets of printed information contain vast amounts of blank space arranged in different locations. Each single black portion of a scan line is also more extensive, on the average, than a single resolution element. It is extremely expensive and inefficient to use valuable facsimile and telephone line time for the transmission of what amounts to noninformation containing signals in the normal facsimile scan process. With a simply stated bit symbol code developed to describe varying lengths of all black or all white scan line segments a substantial saving in transmission time can be effected. Such a bit symbol code, could, for example, be based upon a coded indication of an all white line for a specified length. A computer processing the digital facsimile signal inserts the appropriate code instead of a long period of an informationless digital signal. In this manner the actual digital signal transmitted over the telephone line will have a substantially random probability distribution, and will occupy significantly less time. The amount of time required for such a high efficiency transmission is drastically reduced as compared to uncondensed, real-time transmission of quantized photodetector outputs. A transmission scheme which selects minimally coded digital representations of the same information is indicated in U.S. Pat. No. 3,394,352 to R. Wernikoff et al.

Returning to FIGS. 3B and 3C it is now clear that there is a tremendous advantage to quantizing according to the double threshold technique to achieve the digital signal of FIG. 3B rather than the single threshold level technique resulting in the digital signal of FIG. 3C. The signal of FIG. 3B has only four digital level shifts and consequently substantially less information to be transmitted than the sixteen level shifts of FIG. 3C even though both represent the same indicia. The use of a double threshold system to remove excess transitions, furthermore, is advantageous over a scheme of removing them by simply filtering noise from the analog signal 20 prior to single threshold quantizing because such a filter system would not respond to allow quantizer shifts with rapidly changing signal levels while the dual threshold system, according to the invention, does respond to very fast spikes of desired information present in the analog signal 20.

Figure 4:
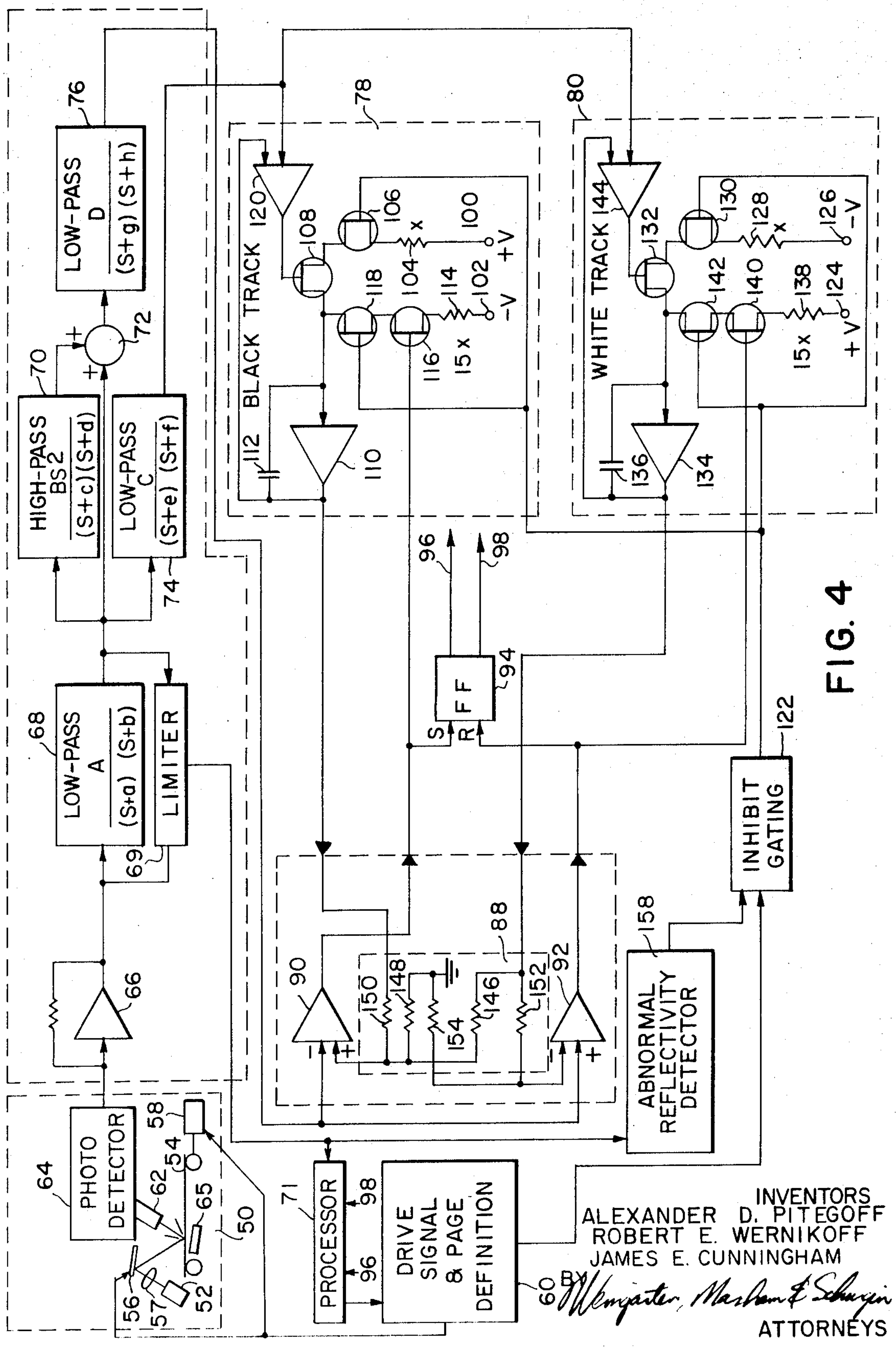
FIG. 4 is a partial schematic and partial block diagram of an adaptive binary state decision system according to the invention.

To appreciate the further features of the invention reference is made to FIG. 4 showing a partial block and partial schematic diagram of a complete adaptive binary state decision system according to the invention. Within a scanning mechanism 50 of a facsimile system a light source 52 illuminates a spot on a sheet 54 through a transmission path including a lens 57 and an oscillating scanning mirror 56. The spot is made to scan successively space lines across the sheet by the cooperation of the oscillating scanning mirror 56 and a sheet position incrementer and driver 58. Oscillatory motion of the mirror 56 is induced by a drive signal and page definition circuit 60 in accordance with the waveform diagrams, FIGS. 1A and 1B, in response to signals from a processor 71. Reflections from the spot on sheet 54 are gathered by a light pipe 62 and transmitted to a photodetector 64. A mirror 65 is positioned adjacent to the unilluminated side of sheet 54 and provides strong specular reflection of light whenever a hole is encountered during the scan of sheet 54.

The light induced analog output current from the photodetector 64 is led to a filter composed of a current-to-voltage converter 66 which feeds its voltage output to a low-pass filter 68. A limiter 69, connected between the input and output of the low-pass filter 68, causes amplitude limiting of the output of low-pass filter 68 and provides a limit indicating signal to the binary signal processor 71. The output of the low-pass filter 68 is fed to a high-pass filter 70, a noninverting input of a summer 72 and to a second low-pass filter 74. The output of the high-pass filter 70 is fed to a further noninverting input of the summer 72 which has its output fed to a third low-pass filter 76. The output of the low-pass filter 76 is a filtered, enhanced response analog input signal for the binary decision system and the output of the low-pass filter 74 is a band-limited signal for generating the black and white thresholds.

The operation of the filters 68, 70, 74 and 76 will first be described. The cascaded combination of the low-pass filters 68 and 74 feeds black and white tracking circuits 78 and 80 respectively and provides an overall low-pass filtering characteristic to the analog signal 20 from the photodetector 64 to eliminate a substantial part of the higher frequency noise from the photodetector 64. Both low-pass filters 68 and 74 are characterized as active 12 db per octave filters having two left s-plane poles. The cutoff point of the filters 68 and 74 in cascade is preferably, but not necessarily, adjusted so as to preserve substantially all of the information content excepting fine detail in the analog signal 20 from the photodetector 64. It is not necessary that all desired information from the sheet 54 be preserved at the output of the low-pass filter 74, it being more significant that photodetector noise is reduced.

Figures 5, 6, 7:
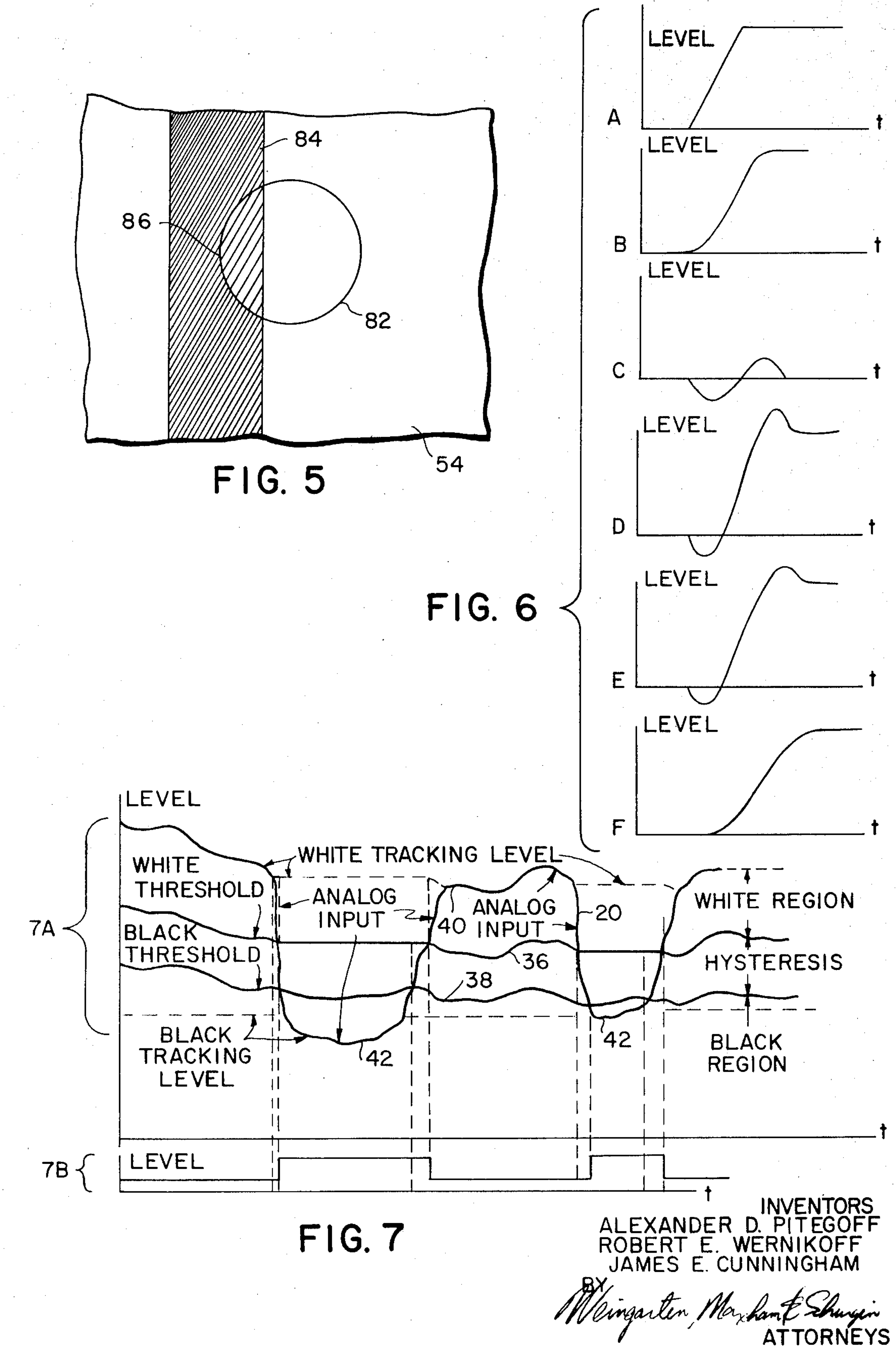
FIG. 5 shows diagrammatically a scanning spot and sheet indicium.

The output of the summer 72 is a combination of the non-inverted output of the high-pass filter 70 and the noninverted output of the low-pass filter 68 and, consequently, possesses a prescribed degree of high frequency emphasis and overshoot. As indicated above, the required finite spot size for the scanning illumination on the sheet 54 prevents the analog signal 20 from making a full level excursion between black and white levels when fine detail is present on the sheet. When such fine detail is first perceived by the photodetector 64, however, the analog signal 20 will react rapidly as though it were going to make a complete excursion between black and white levels but the slope is later slowed by the fact that the reflectivity of the scanning spot ceases to change rapidly once the leading edge of the spot has completely traversed the fine detail element of the sheet 54. This can be seen in FIG. 5 where a spot 82 begins to intercept a line of fine detail 84. It can be seen that as soon as the leading edge 86 of the spot 82 has passed entirely through, in the horizontal direction, the fine detail element 84, the rate of increase or decrease in reflectivity from the spot 82 will drop sharply. The function of the high-pass filter 70 is to emphasize the initial relatively steep slope in the analog signal 20 corresponding to the transition of the leading edge 86 through the detail element 84. This emphasis from the high-pass filter 70 provides enough overshoot in the output of the summer 72 so that the actual level change produced by a fine detail element 84 is substantially greater than in the absence of the high-pass filter 70. The gain of the noninverting input from the high-pass filter 70 in the summer 72 is adjusted according to spot size.

By referring to FIGS. 6A-6E a more complete understanding of the operation of filters 68, 70, and 76 in combination with summer 72 can be obtained. FIG. 6A shows the analog output 20 of photodetector 64 corresponding to the transition between one reflectivity characteristic and another on the sheet 54. FIG. 6B shows the output of the low-pass filter 68 in response to this input. FIG. 6C shows the output of the high-pass filter 70 in response to the signal of FIG. 6B. FIG. 6D shows the output of the summer 72, and FIG. 6E gives the output of the low-pass filter 76, representing the combined and filtered waveforms of FIG. 6B and FIG. 6C. This resulting output, FIG. 6E, has overshoot which emphasizes the short term initial and terminal slopes for fine detail elements or emphasizes sheet characteristics which are just slightly grayer than normal black and white reflectivities. FIG. 6F indicates the band-limited, low-pass output of the filter 74 in response to the low-pass filtered signal from filter 68 shown in FIG. 6B.

Returning to FIG. 4 the black and white tracking circuits 78 and 80 respectively are provided to receive the output of the low-pass filter 74 for developing black and white tracking levels that respond to changes in and represent weighted averages of the respective minima and maxima of the analog signal 20 from the photodetector 64. The black and white tracking levels from the respective circuits 78 and 80 are fed to a potentiometric network 88 from which black and white threshold levels are produced as summations of predetermined percentages of the black and white tracking levels. The black and white threshold levels are conducted to respective noninverting and inverting inputs of respective black and white comparators 90 and 92. Inverting and noninverting inputs of comparators 90 and 92 respectively receive the preemphasized output of the low-pass filter 76. The output of comparator 90 provides a positive set signal to a flip-flop 94 if, and only if, the preemphasized output of filter 76 is below the black threshold level and the comparator 92 provides a positive reset signal to the flip-flop 94 if, and only if, the output of filter 76 is above the white threshold level.

The inverted and noninverted outputs 96 and 98 of the flip-flop 94 are the binary outputs of the decision system and, after being put into one binary state by crossing the appropriate threshold, change to the opposite binary state only when the output of the photodetector 64, as preemphasized at the output of filter 76, crosses the other threshold level indicating it has traversed the entire hysteresis region between the two thresholds.

Figure 8:
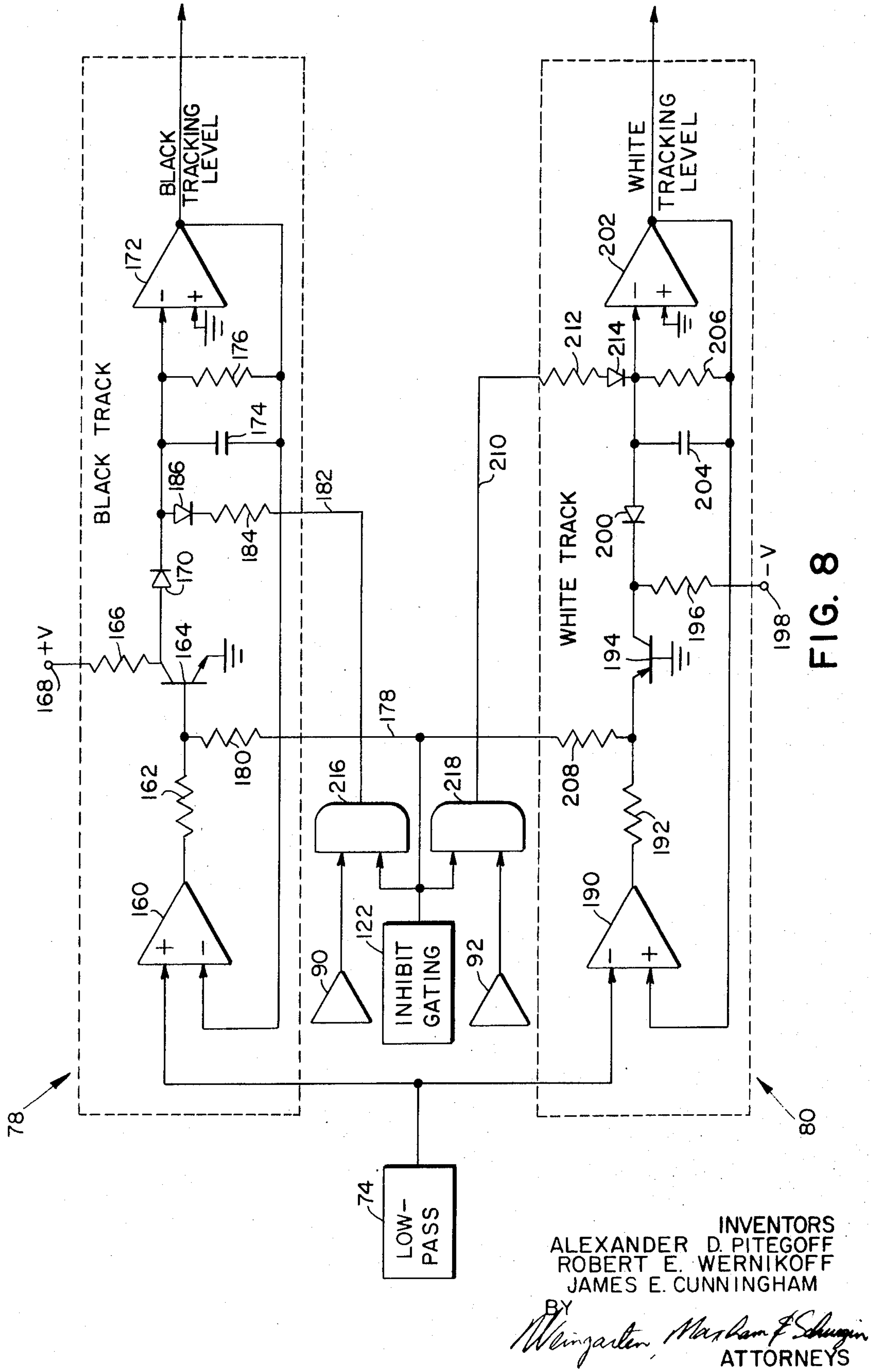
FIG. 8 is a partial schematic and partial block diagram of preferred tracking circuits for use in the diagram of FIG. 4.

The circuit arrangement of the black and white tracking circuits 78 and 80, shown in FIG. 4 as an alternative to the preferred embodiment described later in conjunction with FIG. 8, is presented here for clarity in describing the operation of these circuits. In the black tracking circuit equal positive and negative voltages 100 and 102 are provided. From the positive voltage 100 a resistor 104 of nominal value, $x$, leads to one contact of an electronic switch 106 with the opposite contact leading to a contact of a further electronic switch 108. The other contact of the switch 108 leads to an inverting input of an integrating amplifier 110 having a capacitor 112 providing negative feedback therearound. From the negative voltage 102 a resistor 114 of value greater than $x$, preferably $15x$, leads to a contact of an electronic switch 116 with the opposite contact leading through a further electronic switch 118 and thence to the same inverting input of the amplifier 110. The output of amplifier 110 is the black tracking level.

The output of the low-pass filter 74 feeds one input of a black tracking comparator 120. A differential input of comparator 120 is fed from the output of the integrating amplifier 110. The output of the comparator 120 controls the electronic switch 108 so that it conducts only when the signal level out of the low-pass filter 74 is lower than the signal level at the output of the integrating amplifier 110. The electronic switches 106 and 118 have their control terminals joined and controlled by an inhibit gating circuit 122. The inhibit gating circuit 122 has an off page input from the drive signal circuit 60 corresponding to the two level signal of FIG. 1B. The inhibit gating circuit 122 controls the conduction of electronic switches 106 and 118 such that the contacts of the switches are closed only while the scanning spot is on the scanned sheet 54, intermediate its edges. The electronic switch 116 is controlled by the output of the black comparator circuit 90 so as to permit conduction between its contacts only during a positive state at the output of the black comparator 90 when the preemphasized photodetector signal is below the black threshold.

The white tracking circuit 80 contains positive and negative equal voltages 124 and 126 respectively. The negative voltage 126 is conducted through a resistor 128 of value $x$ and thence through contacts of electronic switches 130 and 132 to an inverting input of an integrating amplifier 134. A negative feedback capacitor 136 is connected around amplifier 134. The signal from the positive voltage 124 is conducted through a resistor 138 of value greater than $x$, preferably $15x$, and thence through contacts of electronic switches 140 and 142 to the same inverting input of the integrating amplifier 134. The output of amplifier 134 is the white tracking level.

One input of a white tracking comparator 144 receives the output of the low-pass filter 74. A differential input of the comparator 144 is fed the signal from the output of the integrating amplifier 134. The output of the comparator 144 controls the electronic switch 132 such that it conducts only when the signal level from the low-pass filter 74 is higher than the output of the integrating amplifier 134. The electronic switches 130 and 142 have their control terminals connected in common to the output of the inhibit gating circuit 122 to provide conduction thereof under the same circumstances as switches 106 and 118. The electronic switch 140 has its control terminal connected to the output of the white comparator 92 and provides conduction between its contacts only if the output of the white comparator 92 is positive when the preemphasized photodetector signal is above the white threshold.

As indicated, the output of the low-pass filter 76 is fed respectively to the inverting and noninverting inputs of the black comparator 90 and the white comparator 92. The noninverting input of the black comparator 90 is supplied with the output of the integrating amplifier 134 through voltage divider resistances 146 and 148 of the network 88 and is further fed the output of the integrating amplifier 110 through voltage divider resistances 150 and 148; the signal on this noninverting input being the black threshold level. An inverting input of the white comparator 92 is fed the output of the integrating amplifier 134 after voltage division by resistors 152 and 154; the signal on the inverting input being the white threshold level. The output of the black comparator 90 is fed to the set input of the flip-flop 94 with the reset input of the flip-flop 94 fed from the output of the white comparator 92. The zero and one level outputs 98 and 96 respectively of the flip-flop 94, representing the noninverted and inverted binary output of the adaptive binary state decision system, are fed to processor 71.

An abnormal reflectivity detector 158 receives the output of the limiter 69 and causes the inhibit gating circuit 122 to bias electronic switches 106, 118, 130, and 142 in an open condition whenever the output of the low-pass filter 76 passes out of a preselected signal range established by limiter 69 to indicate abnormal sheet characteristics.

In the preferred embodiment of FIG. 4, the mirror 65 supporting the sheet 54 provides a "super white" specular reflection into the light pipe 62 whenever a hole is encountered in a scan of sheet 54. The analog signal 20 produced by this "super white" reflection causes limiting of low-pass filter 68 by limiter 69 and a resulting signal to abnormal reflectivity detector 158 indicating the "super white" condition. In response to the "super white" condition abnormal reflectivity detector 158 causes inhibit gating circuit 122 to open circuit electronic switches 106, 118, 130, and 142.

Whenever a hole is encountered in sheet 54 the normally resulting binary signal indicates a low reflectivity characteristic surrounding at least part of the hole and causes a partial black ring to be produced during facsimile reproduction. This is so because some of the light from source 52 passing through the hole will be reflected by mirror 65 and fall on the back surface of sheet 54 due to the fact that the reflecting surfaces of mirror 65 and sheet 54 are slightly displaced. To eliminate this partial black ring, an output of the limiter 69 indicating a "super white" condition is fed to processor 71 along with the binary signal outputs from the flip-flop 94. In the processor 71 black or low reflectivity characteristics are purged from the binary signal adjacent to a "super white" indication.

The operation of the black and white tracking circuits 78 and 80 can be better understood by reference to FIGS. 7A and 7B showing the analog input signal to the black and white comparators 90 and 92 in relationship to the black and white tracking signals produced by integrating amplifiers 110 and 134, respectively, and in relationship to the black and white threshold levels at the noninverting and inverting inputs of black and white comparators 90 and 92, respectively. For simplicity, assume first that the scanning spot is on the sheet 54, between its edges, and that consequently the electronic switches 106, 118, 130 and 142 are all conducting.

If the analog signal from the low-pass filter 74 in FIG. 4 is above the white tracking level at the output of the amplifier 134, the white tracking comparator 144 causes electronic switch 132 to conduct, and, even through electronic switch 140 is conducting, the net input to the integrating amplifier 134 will be a negative current since the resistor 128 is significantly smaller than the resistor 138. This negative net input current to the amplifier 134 causes the output thereof to increase at a predetermined, fast slew rate specified by the integration rate of the negative input current in conjunction with the feedback capacitor 136. When the white tracking level at the output of integrating amplifier 134 is greater than the level of the output of the low-pass filter 74 the electronic switch 132 is opened to prevent conduction through resistor 128 from the negative V potential 126. In this case, if the pre-emphasized photodetector signal from filter 76 is above the white threshold level such that the output of the white comparator 92 is positive, the electronic switch 140 will be conducting and provide a small positive current to the input of the integrating amplifier 134 to cause the white tracking level at its output to decrease at a predetermined, slow slew rate. In resulting operation, a sequence of increasing and decreasing slewings of the white tracking level is produced, repetitively crossing the output level of the filter 74.

The network 88 establishes the white threshold level at, preferably, but not necessarily, 70 percent of the white tracking level so that when the output of the filter 76 is below the white threshold level and, of necessity, below the white tracking level, both electronic switches 132 and 140 are opened and the white tracking level at the output of the amplifier 134 is held constant, indefinitely.

In terms of signal levels shown in FIGS. 7A and 7B the white tracking level increases rapidly and decreases more slowly with variations in the output of the low-pass filter 74 if, and only if, the preemphasized signal at the output of low-pass filter 76 is above the white threshold level.

The black tracking circuit 78 operates in a similar fashion to the white tracking circuit 80. A significant difference is that the black threshold level, at the noninverting input of the black comparator 90, is a composite of a predetermined percentage of the white tracking level, preferably 50 percent, and a predetermined percentage of the black tracking level, preferably 20 percent. Whenever the output of the filter 74 is below the black tracking level at the output of amplifier 110 the black tracking level decreases at a predetermined, fast slew rate, but if the output of the filter 74 is above the black tracking level, while the preemphasized output of the filter 76 is below the black threshold level, then the black tracking level at the output of the amplifier 110 increases at a predetermined, slow slew rate. All slewing is halted if the preemphasized photodetector signal at the output of the filter 76 is above the black threshold level.

In this way, the black and white threshold levels which, in relation to the preemphasized photodetector signal at the output of filter 76, determine the binary output state, are continuously adjusted in response to variations in the respective minima and maxima of the photodetector signal at the output of the filter 74. The continuous adjustment of the black and white threshold levels provides for an accurate indication of the borders between what is clearly black and what is clearly white.

After start up from a power off condition of the binary decision system, actual black and white thresholds and tracking levels are rapidly established without the need for presetting initial conditions to establish approximate threshold and tracking levels. With the first white sheet characteristics, the white tracking level is quickly set by the rapid positive slope slewing of integrating amplifier 134, and from this white tracking level initial black and white thresholds are established.

The two level binary output is fed to processor 71 where it may be data processed for more efficient data transmission in accordance with U.S. Pat. No. 3,394,352.

Preferable circuit details for the black and white tracking circuits 78 and 80 of FIG. 4 are shown in FIG. 8. In the preferred arrangement, the low-pass filtered output of filter 74 is conducted to a noninverting input of an amplifier 160 in the black tracking circuit 78. The output of amplifier 160 is applied through a resistor 162 to the base of a grounded emitter NPN transistor 164. The collector of the transistor 164 leads through a resistor 166 to a terminal 168 at the positive V potential and through a diode 170 to a high input impedance integrating amplifier 172. The output of amplifier 172, which is the black tracking level, is fed back to this input of amplifier 172 through an integrating capacitor 174 and a high impedance resistor 176, in parallel, and is further fed back to an inverting input of amplifier 160. A control signal on a line 178 is conducted to the base of transistor 164 through a resistor 180 and a control signal on a line 182 is conducted to the high impedance input of amplifier 172 serially through a resistor 184 (larger in value than resistor 166) and a diode 186.

In the white tracking circuit 80 the low-pass filtered analog signal from filter 74 is conducted to an inverting input of an amplifier 190 from which the output leads through a resistor 192 to the emitter of a grounded base PNP transistor 194. The collector of transistor 194 leads through a resistor 196 to a terminal 198 of negative V potential, and through a diode 200 into a high impedance input of an integrating amplifier 202. The output of amplifier 202 (the white tracking level) is fed back to its input through an integrating capacitor 204 in parallel with a high impedance resistor 206 and is further fed back to a noninverting input of amplifier 190. The control signal on line 178 is conducted through a resistor 208 to the emitter of PNP transistor 194 and a control signal on a line 210 is serially conducted through a resistor 212 (larger in value than resistor 196) and a diode 214 to the input to amplifier 202.

The control signal on line 182 controls the slow rate, positive slope slewing of the black tracking level and is derived from a nonexclusive OR gate 216 which receives as control inputs the signals from the black comparator 90 and inhibit gating circuit 122, while the negative V potential is the signal gated. Gate 216 provides, as the control signal on line 182, the negative V potential unless either the output of comparator 90 is not positive (analog photodetector signal greater than the black threshold) or the inhibit gating circuit 122 is providing an inhibit signal; or both. The control signal on line 210 likewise controls the slow rate, negative slope slewing of the white tracking level and is derived from a nonexclusive OR gate 218 receiving as control inputs the signals from the inhibit gating circuit 122 and white comparator 92 while the positive V potential is the signal gated. Gate 218 provides, as the control signal on line 210, the positive V potential unless either the output of comparator 92 is not positive (analog photodetector signal level less than the white threshold) or the inhibit gating circuit is providing an inhibit signal; or both. The inhibit signal is the logic inversion of the inhibit signal of FIG. 4 and is represented by the inverse of FIG. 1B. The control signal on line 178 is directly the output of the inhibit gating circuit 122 and inhibits the fast slew rate responses of the black and white tracking levels whenever an inhibit signal is present at the output of inhibit gating circuit 122. Whenever an inhibit signal from the inhibit gating circuit 122 is present, both black and white tracking levels are prevented from varying.

For the black tracking circuit 78 the positive V potential 168, through the resistor 166, provides the fast rate, negative slope slewing. It is enabled by amplifier 160 and transistor 164 whenever the output of low-pass filter 74 is less than the black tracking level and is disabled in the case where the output of the filter 74 exceeds the black tracking level. The control signal on line 182 provides the slow rate, positive slope slewing and is overridden by the positive V potential through resistor 166. Both fast and slow slewing of the black tracking level are disabled by an inhibit signal from the inhibit gating circuit 122 through the control signals on lines 178 and 182.

For the white tracking circuit 80 the negative V potential 198 through the resistor 196 provides the fast rate, positive slope slewing. It is enabled by amplifier 190 and transistor 194 whenever the output of the low-pass filter 74 exceeds the white tracking level and is disabled in the case where the filter 74 output is less than the white tracking level. The control signal on line 210 provides the slow rate, negative slope slewing and is overridden by the negative V potential through resistor 196. Both fast and slow slewing of the white threshold level are disabled by an inhibit signal from the inhibit gating circuit 122 through control signals on lines 178 and 210.

While the above embodiments have been described with reference to decision logic for a facsimile scan signal wherein black and white thresholds are continuously adjusted in response to the scan signals, advantages of the invention may also be obtained from a system wherein the black and white thresholds are set at one or more discrete, constant levels during the scan of a document. These discrete levels are determined on the basis of weighted averages of the analog scan signal over predetermined scan lengths such as one or more scan lines. In such a case, the one or more scan lines are prescanned so that weighted averages of the black and white representing photodetector signals are made available during the prescan to permit a determination of discrete black and white decision thresholds that are employed during the normal scan of corresponding parts or the entirety of a document.

Figure 9:
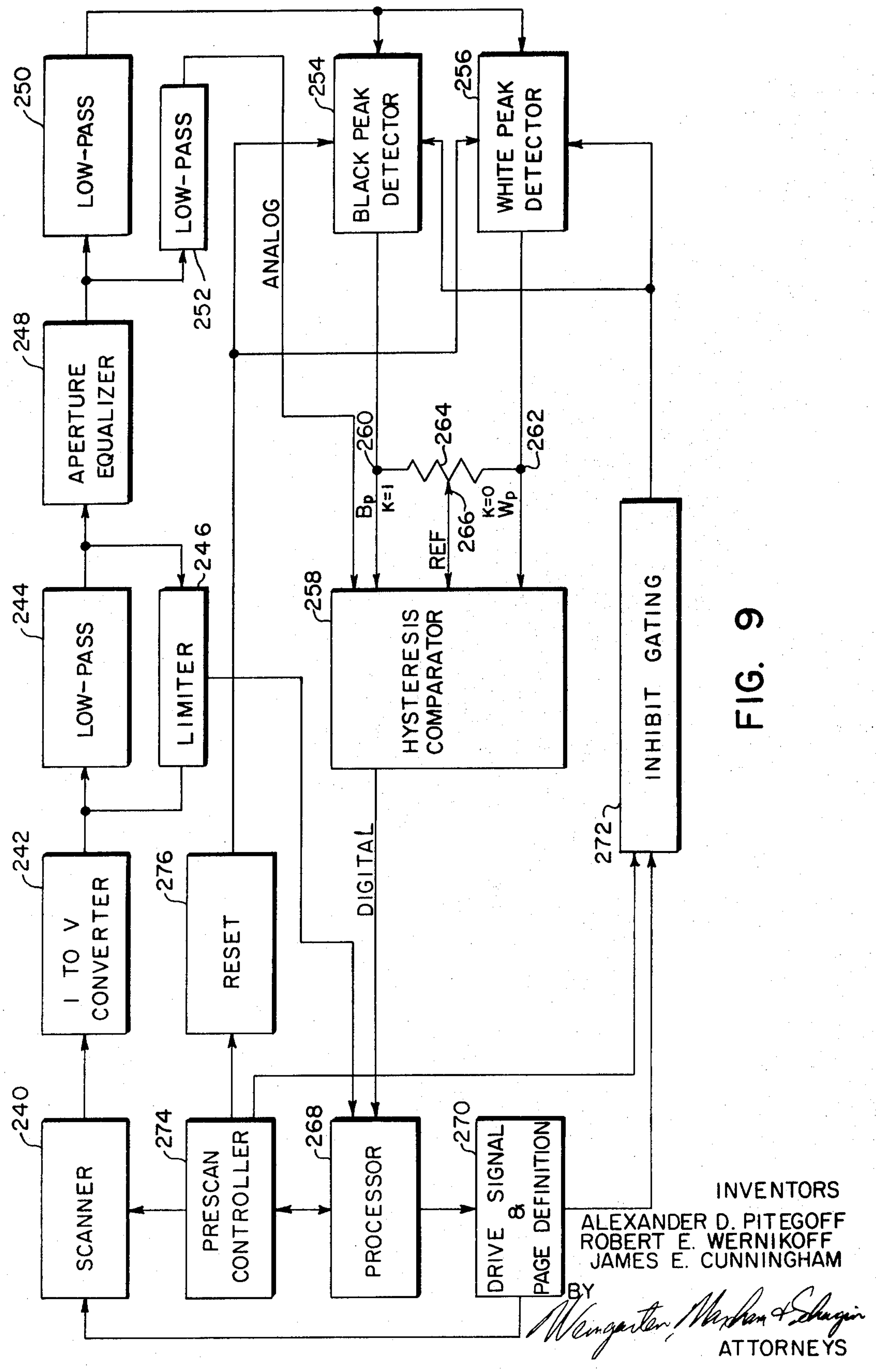
FIG. 9 is a block diagram of an alternative adaptive state binary decision system according to the invention.

In particular, in FIG. 9 a block diagram is shown of circuitry for accomplishing this function. A scanning mechanism 240, similar to the scanning mechanism 50 of FIG. 4, has an analog photodetector output signal which is conducted to the input of a current-to-voltage converter 242. The output of the converter 242 is a voltage analog of its current input and is fed to a low-pass filter 244. The output of the low-pass filter 244 is fed back to its input through a limiter 246 to produce a result similar to that obtained from the low-pass filter 68 and limiter 69 of FIG. 4. The output of the low-pass filter 244 is also fed into an aperture equalizer 248 functioning in a manner similar to the high-pass filter and summer 70 and 72, respectively, of FIG. 4.

The output of the aperture equalizer 248 is fed to respective low-pass filters 250 and 252. The output of the low-pass filter 250 is fed, as input, to both a black peak detector 254 and a white peak detector 256. The output of the low-pass filter 252 is applied, as an analog input signal, to a hysteresis comparator 258.

The output of the black peak detector, on a line 260, is analogous to the black tracking level and represents a weighted average (Bp) of the filtered minima from the low-pass filter 250. This signal is applied as an input to the comparator 258. The output of the white peak detector 256, on a line 262, is analogous to the white tracking level and represents a weighted average (Wp) of the filtered maxima in the analog signal from the low-pass filter 250. This signal is applied as an input to the comparator 258. A voltage potentiometer 264 is connected between the lines 260 and 262 and provides, at a linearly adjustable potentiometric tap 266, a reference signal level (REF) that is fed to a further input of the hysteresis comparator 258. The position of the tap 266 is numerically represented by a parameter K where K is zero when REF is Wp and K is one where REF is B*p*. K is manually adjusted for optimum facsimile reproduction quality.

The hysteresis comparator 258 provides a two level, digital output which is applied to a data processor 268 for further data processing or transmission as the two level, white-black representing signal. The processor 268 also receives a limit signal input from the limiter 246 and provides a scanning spot control signal to a drive signal and page definition circuit 270, functioning in a manner similar to the circuit 60 of FIG. 4. The drive signal and page definitions circuit 270 provides an off page signal to an inhibit gating circuit 272 which in turn provides a corresponding signal to the black and white peak detectors 254 and 256, respectively causing them to maintain the level of their outputs when the spot is off the page of a document being scanned. The drive signal and page definition circuit 270 further provides a scanner drive signal to the scanner 240.

A prescan controller 274 is provided and generates a prescan control signal which is fed to the scanner 240 in response to a prescan condition signal from the data processor 268. The prescan controller 274 also provides a gating signal to the inhibit gating circuit 272 to cause the detectors 254 and 256 to maintain their output when the system is not in a prescan mode. Controller 274 also provides a signal to a reset circuit 276 which in turn provides a reset function signal to both the black and white peak detectors 254 and 256 prior to a prescan.

In operation, the prescan controller 274 causes the scanner 240 to produce a prescan of a given document fed into the scanner 240. The prescan may, for example, comprise a single line prescan of each line prior to its scan for purposes of producing a two level digital signal. The prescan in such a case, can conveniently take place during a retrace cycle for each scan line by the scanner 240. Alternatively, and preferably, the prescan controller 274 causes the scanner 240 to scan through a selected portion of a document for the purposes of sampling average reflectivity characteristics of the document in indicia and nonindicia containing portions.

During either prescan mode, the prescan controller 274 provides a gating signal to inhibit gating circuit 272 to cause the detectors 254 and 256 to provide, on their respective output lines 260 and 262, signals representative of weighted average minima an maxima in the signal from the low-pass filter 250. Typically, the peak detectors 254 and 256 operate in a manner slightly modified from the functioning of the black and white tracking circuits 78 and 80 of FIG. 4. In particular, the peak detectors 254 and 256 cause the black and white representing signals on lines 260 and 262 to respond, at predetermined slew rates, to relative decreases and increases in the analog signal output of the low-pass filter 250 without reverse slewing in response to respective increases and decreases. The response characteristic of the low-pass filter 250 is such as to eliminate occasional, spurious noise spikes from the analog photodetector signal to insure that such noise signals are ignored by the peak detectors.

Prior to each prescan, the prescan controller 274 provides a prescan initiate signal to the reset circuit 276 which in turn provides reset signals to both the black and white peak detectors 254 and 256 to reset the values of their black and white representing output signals respectively at levels well above and below expected black and white minima and maxima respectively.

During prescanning, the inhibit gating circuit 272 operates on page edge or hole signals from the drive signal and page definition circuit 270 to inhibit the black and white peak detectors 254 and 256 and prevent their respective outputs from responding to analog input signals from outside the document.

Once this prescan function has been completed, the controller 274 provides a hold signal to inhibit gating circuit 272 which causes the black and white representing signals on the output lines 260 and 262 respectively to be maintained, constant.

Representative black and white signals B*p* and W*p* established by the detectors 254 and 256, the manually adjusted REF signal, and the analog signal from filter 252 operate within the hysteresis comparator 258 to provide a digital output signal representative of the level of the analog input signal in relation to internally generated black and white threshold signal levels (B*t* and W*t*). Analog and logic functions with the hysteresis comparator 258 produce the black and white threshold signal levels according to the following circuit function equations:

$$Wt = Wp - K(Wp - Bp);$$

$$Bt = Wp - K(Wp - Bp) - C(Wp - Bp); \text{ and}$$

$$H = Wt - Bt = C(Wp - Bp),$$

where H is the hysteresis separation between the black and white thresholds and $C$ is an internally adjusted alignment factor. The digital output signal D is in one of two states B and W indicating respectively black and white document characteristics in accordance with the following logic equation:

$$D \text{ is } W, \text{ if } A > Wt;$$

$$D \text{ is } B, \text{ if } A < Bt; \text{ and}$$

$$D \text{ remains unchanged when } Bt < A < Wt,$$

where $A$ is the analog signal level from the low-pass filter 252.

Having described an illustrative preferred embodiment according to the invention it will be clear to those skilled in the art that modifications and alterations to the specific implementation may be achieved without departing from the spirit and scope of the invention. It is accordingly intended to limit the scope of the invention only as indicated in the following claims.

What is claimed is:

1. A binary state decision system for quantizing an analog signal into a two level output signal comprising:
   means for receiving said analog signal for quantization;
   means for emphasizing rapid changes in said analog signal over a predetermined range of rates of change of said analog signal;
   means responsive to said analog signal for identifying a predetermined amplitude range of analog signals included in the range of variation of said analog signal;
   means responsive to the emphasized analog signal and said predetermined amplitude range for developing relatively higher and lower threshold signal levels as predetermined combinations of the amplitude of said analog signal outside said predetermined amplitude range; and
   means responsive to said emphasized analog signal for generating one level of said output signal whenever said emphasized analog signal is greater than said higher threshold signal level and for generating the second level of said output signal whenever said emphasized analog signal is less than said lower threshold signal level.

2. The binary state decision system of claim 1 wherein the levels of the extremes of said predetermined amplitude range are the levels of said relatively higher and lower threshold signals.

3. A binary decision circuit for generating a two level binary output signal representative of predetermined characteristics of analog input signals comprising:
   means for receiving said analog input signals;
   means operative in response to those analog input signals greater than a first predetermined signal level for developing a first threshold level;
   means operative in response to those analog input signals outside a range of analog input signals between said first and a second predetermined signal level for developing a second, lower threshold signal level; and
   means for producing the first of said two levels of said binary output signal in response to said analog input signals being greater than said first threshold signal level and for producing the second of said two levels of said binary output signal in response to said input analog signals being less than said second threshold signal level;
   said means for producing said first and second levels of said binary output signal having a hysteresis characteristic between said first and second threshold signal levels for maintaining the level of said binary output signal until said analog input signal crosses the threshold signal level opposite the threshold signal level establishing the existing level of said binary output signal.

4. The binary decision circuit of claim 3 further including:
   means for processing said two level binary output signal to provide data compression for more efficient data communication.

5. The binary decision circuit of claim 3 wherein said first and second predetermined signal levels are respectively said first and second threshold signal levels.

6. A signal processor operative to convert an analog photodetector signal to a binary signal representative of black and white reflectivity characteristics of matter scanned by an illuminated spot, said signal processor comprising:
   means for providing enhanced response filtering of said analog photodetector signal to provide significant reduction of noise on said analog photodetector signal while enhancing response to portions of said analog photodetector signal representing finer detail in said matter scanned than the width of said spot;
   means for low-pass filtering said analog photodetector signal and providing a low-pass filtered analog signal which includes the DC level of said analog photodetector signal;
   first tracking means for tracking said low-pass filtered analog signal when it is above a first predetermined signal level to provide a first tracking signal which responds rapidly to increases in said low-pass filtered analog signal above said first predetermined signal level, which responds relatively more slowly to decreases in said low-pass filtered analog signal from levels above said first predetermined signal level, and which remains constant whenever said enhanced response analog signal is below said first predetermined signal level;

second tracking means for tracking said low-pass filtered analog signal when it is below a second predetermined signal level to provide a second tracking signal which responds rapidly to decreases in said low-pass filtered analog signal, which responds relatively more slowly to increases in said low-pass filtered analog signal from levels below said second predetermined level, and which remains constant whenever said enhanced response analog signal is above said second predetermined signal level;

means for establishing a first threshold signal level as a predetermined percentage of at least said first tracking signal;

means for establishing a second threshold signal level as a combination of predetermined percentages of said first and second tracking signals; and output means for providing one level of said binary signal whenever said enhanced response analog photodetector signal exceeds said first threshold signal level, for providing the second level of said binary signal whenever said enhanced response analog photodetector signal is less than said second threshold signal level, and for providing no change in said binary signal level when said enhanced response analog photodetector signal crosses one of said threshold signal levels into the range between said threshold signal levels.

7. The signal processor of claim 6 wherein said means for enhanced response filtering of said analog photodetector signal provides overshoot in its response to a range of relatively steep slopes in said analog photodetector signal.

8. The signal processor of claim 6 further including:

means responding to said analog photodetector signal for detecting abnormal reflectivity characteristics in said matter scanned; and means for inhibiting said first and second tracking means from tracking said low-pass filtered analog signal in response to said detection of said abnormal reflectivity characteristics.

9. The signal processor of claim 8 wherein said means for detecting abnormal reflectivity characteristics further includes:

means for indicating if said abnormal reflectivity characteristic is high;

means for providing an abnormally high reflectivity in response to a hole through said matter scanned; and means for processing said binary signal and operative to provide a predetermined level of said binary signal in place of the level provided by said output means in response to detection of said abnormally high reflectivity characteristic and also in response to the presence of said illuminated spot within a predetermined area adjacent the area of detection of said abnormally high reflectivity characteristic.

10. The signal processor of claim 6 further comprising:

first and second means for accumulating signals comprising said first and second tracking means respectively;

means for applying a relatively higher magnitude signal to said first signal accumulating means to cause positive slope signal accumulation thereby whenever said low-pass filtered analog signal is greater than said first tracking signal level;

means for applying to said first signal accumulating means a relatively lower magnitude signal to cause relatively lower negative slope signal accumulation thereby whenever said low-pass filtered analog signal is less than said first tracking signal level and said enhanced response analog signal is greater than said first predetermined signal level;

means for preventing signal accumulation by said first signal accumulating means whenever said enhanced response analog signal is less than said first predetermined signal level;

means for applying to said second signal accumulating means a relatively higher magnitude signal to cause relatively higher negative slope signal accumulation thereby whenever said low-pass filtered analog signal is less than said second tracking signal;

means for applying to said second signal accumulating means a relatively lower magnitude signal to cause relatively lower positive slope signal accumulation thereby whenever said low-pass filtered analog signal is greater than said second tracking signal level and said enhanced response analog signal is less than said second predetermined signal level; and means for preventing signal accumulation by said second signal accumulating means whenever said enhanced response analog signal is greater than said second predetermined level;

said first and second tracking signals being respectively the signals accumulated by said first and second signal accumulating means;

said first and second predetermined signal levels being defined by said first and second threshold signal levels respectively.

11. The signal processor of claim 6 further comprising:

means for causing a prescan of portions of said matter;

means for enabling tracking of said low-pass filtered signal by said first and second tracking means during said prescan of portions of said matter and for maintaining said first and second tracking signals unchanged during scanning of said matter subsequent to said prescan; and means for receiving from said output means the first and second levels of said binary signal during scanning of said matter subsequent to said prescan.

12. A binary state decision system for quantizing an analog signal into a two level output signal comprising:

means for receiving said analog signal for quantization;

means responsive to said received analog signal for developing a plurality of signals respectively representative of relatively higher level and relatively lower level portions of said received analog signal;

means for combining said plurality of signals to produce decision criteria separating the range of said received analog signal into white and black regions and an intermediate hysteresis region; and means operative in response to said received analog signal and said decision criteria for producing the first level of said two level output signal whenever said received analog signal is in said white region and for producing the second level of said two level output signal whenever said received analog signal is in said black region;

the level of said two level output signal remaining unchanged whenever said received analog signal enters said hysteresis region.

13. The binary state decision system of claim 12 further comprising means for enhancing the production of transitions between said first and second levels of said two level output signal in response to predetermined frequencies of said received analog signal.

14. The binary state decision system of claim 13 wherein said enhancing means includes:

means for causing overshoot response to said predetermined frequencies of said received analog signal prior to its use in producing the first and second levels of said two level output signal; and means for causing reduced response to short duration, transient portions of said received analog signal prior to its use in developing said plurality of signals.

15. The binary state decision system of claim 12 further comprising:

means for previewing one or more portions of said received analog signal at least once;

means for causing said development of said plurality of signals in response to said previewed portions of said received analog signal;

means for causing said plurality of signals to remain unchanged during reception of said analog signal subsequent to the previewing thereof;

said means for producing said first and second levels of said two level output signal being responsive to said received analog signals subsequent to the previewing thereof and responsive to said decision criteria resulting from the development of said plurality of signals in response to said previewed portions of said received analog signal.

16. The binary state decision system of claim 12 wherein said decision criteria continuously adjust in response to the signal levels of said relatively higher level and relatively lower level portions of said received analog signal.

17. A signal processor for quantizing an analog scan signal representing reflectivity characteristics of matter being scanned into a binary signal, said signal processor comprising:

means for receiving said analog scan signal;

means for developing first and second signals in response to said analog scan signal to represent respectively weighted maxima and minima levels of said received analog scan signal;

means for establishing first and second threshold signal levels in response to said first and second signals;

means for generating one state of said binary signal whenever said received analog signal is greater than said first threshold signal level, for generating the other state of said binary signal whenever said received analog signal is less than said second threshold signal level, and for maintaining the state of said binary signal whenever said received analog scan signal crosses one of said threshold signal levels into the signal region between said first and second threshold signal levels.

18. The signal processor of claim 17 further including:

means for causing a prescan of said matter; and means for producing the development of said first and second signals in response to the received analog scan signal during said prescan and for maintaining said first and second signals unchanged during scanning of said matter subsequent to said prescan;

said generating means being operative during scanning of said matter subsequent to said prescan to provide said first and second states of said binary signal in response to said received analog scan signal.

* * * * *